(12) United States Patent
Goldstein et al.

(10) Patent No.: US 12,666,300 B2
(45) Date of Patent: Jun. 23, 2026

(54) LOW-COMPLEXITY ARTIFICIAL INTELLIGENCE-BASED CHANNEL LINK ADAPTATION

(71) Applicant: Dell Products L.P., Round Rock, TX (US)

(72) Inventors: Eran Goldstein, Montreal (CA); Mohammed Abdelsadek, Kanata (CA); Evgeny Paltin, Montreal (CA); Jayaram Venguduswamy Srinivasan, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 277 days.

(21) Appl. No.: 18/460,006

(22) Filed: Sep. 1, 2023

(65) Prior Publication Data

US 2025/0081026 A1     Mar. 6, 2025

(51) Int. Cl.
*H04W 28/02* (2009.01)
*H04L 1/00* (2006.01)
*H04L 43/0823* (2022.01)

(52) U.S. Cl.
CPC ....... *H04W 28/0268* (2013.01); *H04L 1/0003* (2013.01); *H04L 43/0847* (2013.01); *H04W 28/0273* (2013.01)

(58) Field of Classification Search
None
See application file for complete search history.

(56) References Cited

U.S. PATENT DOCUMENTS

| | | | | |
|---|---|---|---|---|
| 8,675,794 B1 * | 3/2014 | Perets | .................. | H04L 1/0026 |
| | | | | 375/264 |
| 11,070,301 B2 * | 7/2021 | Su | ........................ | H04B 7/0626 |
| 2014/0301220 A1 * | 10/2014 | Li | ....................... | H04W 52/343 |
| | | | | 370/278 |
| 2021/0036804 A1 | 2/2021 | Zhu et al. | | |
| 2024/0106508 A1 * | 3/2024 | Tang | .................... | H04L 1/0029 |

OTHER PUBLICATIONS

International Search Report and Written Opinion received for PCT Application Serial No. PCT/US2024/013889 dated Jun. 6, 2024, 19 pages.

(Continued)

*Primary Examiner* — Anh Vu H Ly
(74) *Attorney, Agent, or Firm* — Amin, Turocy & Watson, LLP

(57) ABSTRACT

A method for low-complexity artificial intelligence-based channel link adaptation includes converting, by a device including a processor, a first vector of signal quality values corresponding to respective frequency subcarriers utilized by a cell of a communication network into a second vector of model input parameters. The first vector has a first size that is smaller than a second size of the second vector. The method further includes selecting, by the device, a modulation and coding scheme based on applying the second vector to a machine learning model. The method additionally includes facilitating, by the device, conducting a transmission from the cell using the modulation and coding scheme, resulting in the transmission having a first throughput that is higher than a second throughput associated with the cell before the facilitating.

20 Claims, 10 Drawing Sheets

(56) References Cited

OTHER PUBLICATIONS

Mota et al., "Adaptive Modulation and Coding Based on Reinforcement Learning for 5G Networks", IEEE, 2019, 6 pages.
Tato et al., "Neural Network Aided Computation of Mutual Information for Adaptation of Spatial Modulation", IEEE, Transactions on Communications, vol. 68, No. 5, May 2020, pp. 2809-2822.
International Preliminary Report on Patentability for International Application No. PCT/US2024/013889 dated Mar. 12, 2026.
Communication pursuant to Rules 161(1) and 162 EPC for EP Application No. 24710570.3 dated Apr. 10, 2026.

* cited by examiner

100

400

Dimensionality reduction component
110

Histogram component
410

Signal quality values

Signal quality histogram
20

600

700

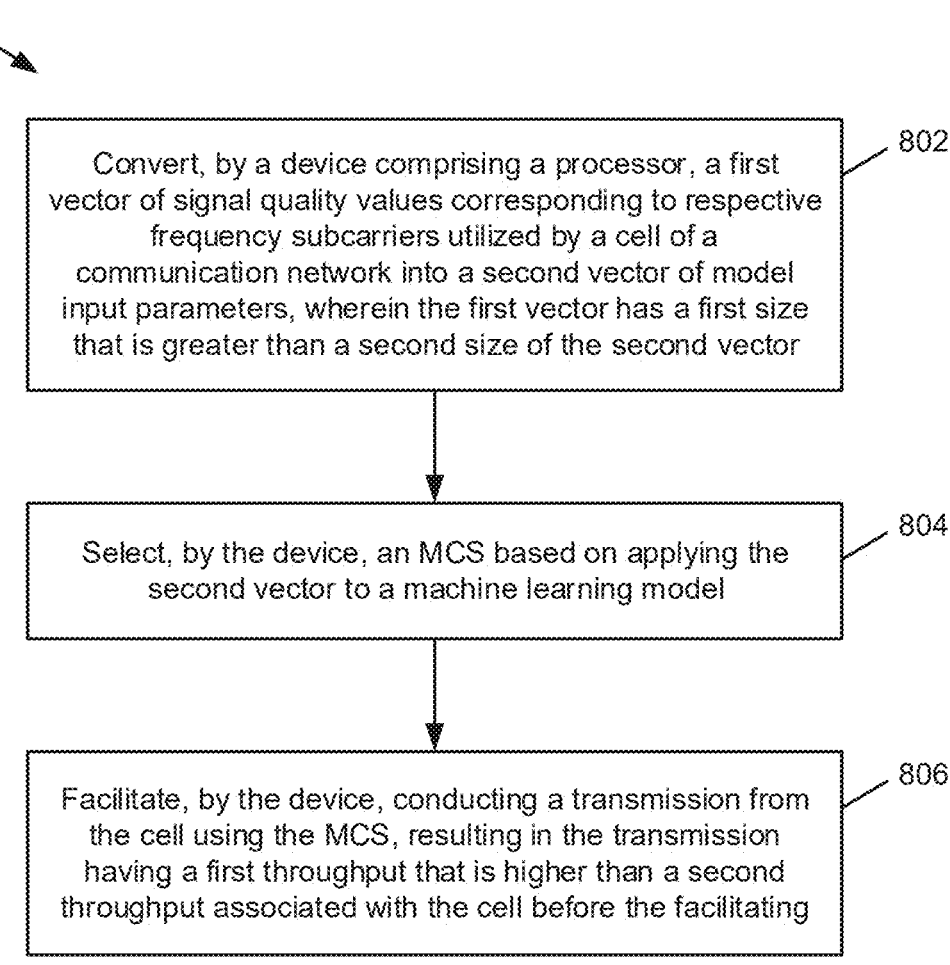

800

Convert, by a device comprising a processor, a first vector of signal quality values corresponding to respective frequency subcarriers utilized by a cell of a communication network into a second vector of model input parameters, wherein the first vector has a first size that is greater than a second size of the second vector

802

Select, by the device, an MCS based on applying the second vector to a machine learning model

804

Facilitate, by the device, conducting a transmission from the cell using the MCS, resulting in the transmission having a first throughput that is higher than a second throughput associated with the cell before the facilitating

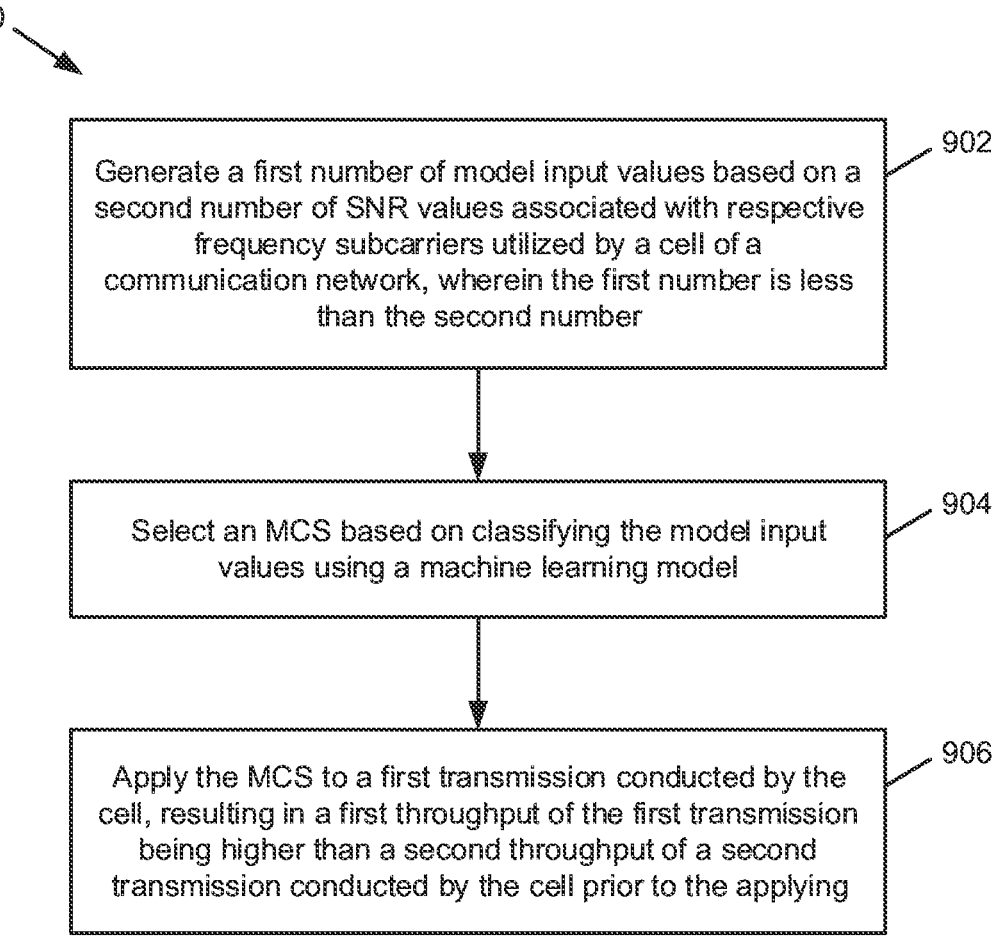

900

902
Generate a first number of model input values based on a second number of SNR values associated with respective frequency subcarriers utilized by a cell of a communication network, wherein the first number is less than the second number 904
Select an MCS based on classifying the model input values using a machine learning model 906
Apply the MCS to a first transmission conducted by the cell, resulting in a first throughput of the first transmission being higher than a second throughput of a second transmission conducted by the cell prior to the applying

FIG. 9

LOW-COMPLEXITY ARTIFICIAL INTELLIGENCE-BASED CHANNEL LINK ADAPTATION

BACKGROUND

In Fifth Generation (5G) and/or other wireless communication networks, link adaptation can be utilized for communication channels, such as a physical uplink shared channel (PUSCH), in order to maximize cell throughput and achieve target uplink data rates and/or reliability levels. Generally, link adaptation is performed by adapting a modulation and coding scheme (MCS) based on channel conditions. The channel conditions can be estimated, e.g., by calculating the uplink signal-to-interference-and-noise ratio (SINR) utilizing uplink reference signals.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include a memory that stores executable components and a processor that executes the executable components stored in the memory. The executable components can include a dimensionality reduction component that generates, based on signal quality values respectively corresponding to respective ones of a first number of frequency subcarriers utilized by a cell of a communication network, a second number of model input values, where the second number is less than the first number. The executable components can further include a classification component that selects, via a machine learning model and based on the model input values, a data rate parameter for the cell. The executable components can also include a link adaptation component that applies the data rate parameter to a transmission conducted by the cell, resulting in an error rate associated with the transmission being less than a threshold error rate.

In another implementation, a method is described herein. The method can include converting, by a device including a processor, a first vector of signal quality values corresponding to respective frequency subcarriers utilized by a cell of a communication network into a second vector of model input parameters, where the first vector has a first size that is greater than a second size of the second vector. The method can additionally include selecting, by the device, a modulation and coding scheme (MCS) based on applying the second vector to a machine learning model. The method can further include facilitating, by the device, conducting a transmission from the cell using the MCS, resulting in the transmission having a first throughput that is higher than a second throughput associated with the cell before the facilitating.

In an additional implementation, a non-transitory machine-readable medium is described herein that can include instructions that, when executed by a processor, facilitate performance of operations. The operations can include generating a first number of model input values based on a second number of signal to noise ratio values associated with respective frequency subcarriers utilized by a cell of a communication network, where the first number is less than the second number; selecting an MCS based on classifying the model input values using a machine learning model; and applying the MCS to a first transmission conducted by the cell, resulting in a first throughput of the first transmission being higher than a second throughput of a second transmission conducted by the cell prior to the applying.

DESCRIPTION OF DRAWINGS

Various non-limiting embodiments of the subject disclosure are described with reference to the following figures, wherein like reference numerals refer to like parts throughout unless otherwise specified.

FIG. 8 is a flow diagram of a method that facilitates low-complexity AI-based channel link adaptation in accordance with various implementations described herein.

FIG. 9 is a flow diagram depicting respective operations facilitating low-complexity AI-based channel link adaptation that can performed by a processor in accordance with various implementations described herein.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Figure 1:
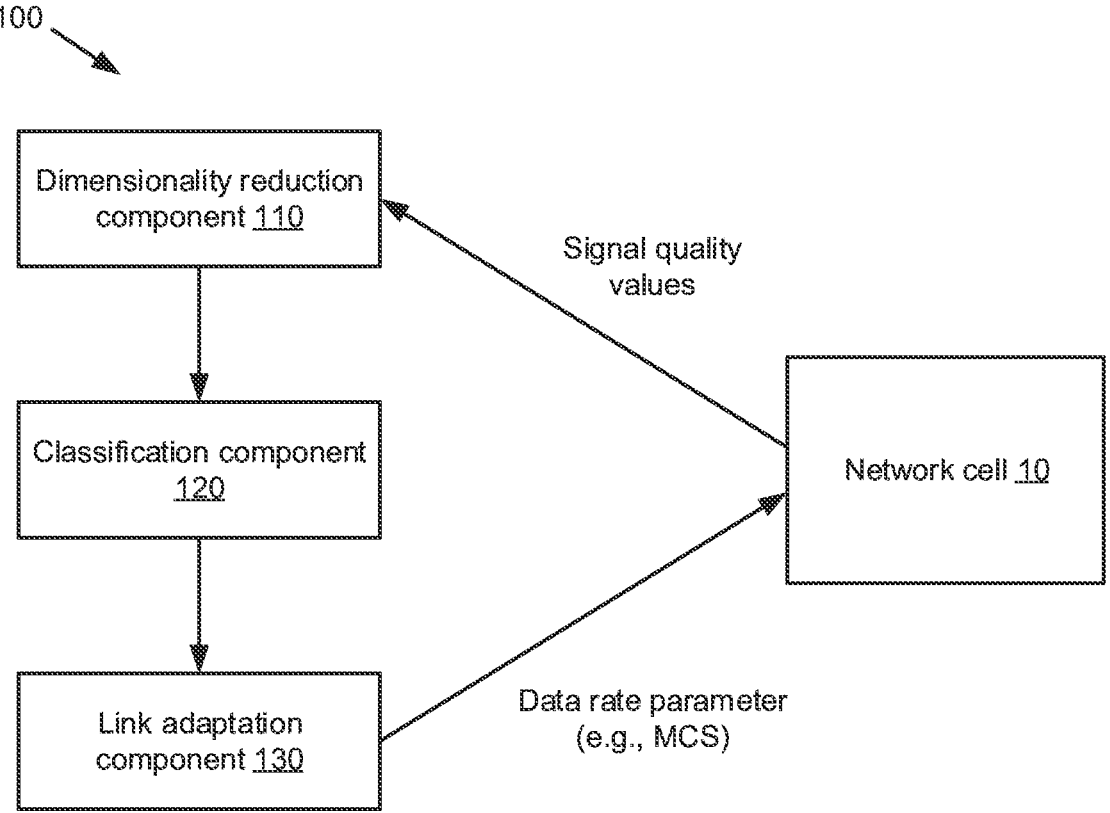
FIG. 1 is a block diagram of a system that facilitates low-complexity artificial intelligence (AI)-based channel link adaptation in accordance with various implementations described herein.

With reference now to the drawings, FIG. 1 illustrates a block diagram of a system 100 that facilitates low-complexity artificial intelligence (AI)-based channel link adaptation in accordance with various implementations described herein. System 100 as shown in FIG. 1 includes a dimensionality reduction component 110, a classification component 120, and a link adaptation component 130, each of which can operate as described in further detail below. In an implementation, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 10.

Additionally, it is noted that the functionality of the respective components shown and described herein can be implemented via a single computing device and/or a combination of devices. For instance, in various implementations, the dimensionality reduction component 110 shown in FIG. 1 could be implemented via a first device, the classification component 120 could be implemented via the first device or a second device, and the link adaptation component 130 could be implemented via the first device, the second device, or a third device. Also, or alternatively, the functionality of a single component could be divided among multiple devices in some implementations.

As further shown by FIG. 1, the components 110, 120, 130 of system 100 can be utilized to manage the operation of a network cell 10, e.g., a cell of a wireless communication network. For instance, the components 110, 120, 130 of system 100 can be utilized to control the operation of a base station, access point, and/or other device(s) that provide communication functionality for devices within the cell 10 and/or that are otherwise within a communication range of network equipment associated with the cell 10. While the network cell 10 is shown in FIG. 1 as a single block for simplicity of illustration, it is noted that the functionality of the network cell 10 could be split among multiple devices, e.g., between a radio unit and a distributed unit in an Open Radio Access Network (O-RAN) architecture, and/or in any other suitable manner.

While the components 110, 120, 130 are shown in FIG. 1 as separate from the network cell 10 for purposes of illustration, it is noted that some or all these components 110, 120, 130, and/or other components that will be described below, could also be implemented by the network cell 10, e.g., via one or more devices associated with the network cell 10. Additionally, while various references are made herein to specific network standards or channels, such as a physical uplink shared channel (PUSCH) in a Fifth Generation (5G) network architecture, it is noted that similar concepts to those described herein could be applied to other network standards and/or channels without departing from the scope of this description or the claimed subject matter. Likewise, it is noted that the naming conventions utilized herein for various network channels or the like are merely for descriptive purposes and are not intended to limit the description or the claimed subject matter to any particular network(s) and/or standard(s).

As noted above, link adaptation can be implemented for communication channels, such as a physical uplink shared channel (PUSCH), by adapting a modulation and coding scheme (MCS) and/or other communication parameters based on channel conditions. Generally, this is performed based on the average signal to interference and noise ratio (SINR) values across the frequency subcarriers allocated for communication. However, a simple average SINR across all subcarriers does not reflect the SINR on all of the subcarriers, which can result in reduced channel characterization accuracy. This, in turn, results in the selection of a non-optimal MCS, which can result in throughput losses and reliability issues due to, e.g., higher retransmission rates when selecting an MCS that is too high and/or underutilization of channel capacity when selecting an MCS that is too low.

In view of at least the above, described herein are techniques to facilitate low-complexity AI-based link adaptation, e.g., for PUSCH and/or other channels. For example, an AI-based classifier is described herein that can be used to select an optimal MCS for PUSCH and/or other channels based on current channel conditions and target reliability levels. Additionally, dimensionality reduction techniques are described herein that can reduce the training and processing times of the proposed models and increase prediction accuracy. These dimensionality reduction techniques can enable AI-based classification as described herein to occur in real time or near-real time by, e.g., enabling automated decisions on a sub-millisecond scale. As a result, implementations described herein can increase overall throughput of a network cell 10 while simultaneously lowering its associated error rate. Other advantages of the implementations described herein are also possible. It is also noted that, due to the nature and quantity of signal quality data and/or other data that can be processed as described herein, as well as the timeframe (e.g., sub-millisecond) required for such processing to be useful in a wireless communications context, implementations described herein can facilitate operations that could not be performed by a human, or by a general-purpose computer utilizing conventional computing techniques, in a useful or reasonable timeframe.

With reference now to the components of system 100, the dimensionality reduction component 110 can generate model input values based on data that can include, e.g., signal quality values that respectively correspond to frequency subcarriers used by the network cell 10. In an implementation, the signal quality values can be per-subcarrier values that indicate a channel quality metric, such as a signal to noise ratio (SNR), SINR, or the like. Accordingly, the dimensionality reduction component 110 can receive a number of signal quality values as input that equal the number of frequency subcarriers used by the network cell 10. As a result of the processing performed by the dimensionality reduction component 110, the number of model input values produced as output by the dimensionality reduction component 110 can be smaller than the number of signal quality values. This, in turn, can simplify AI-based processing of the model input values and enable real-time decision-making. Examples of techniques that can be used by the dimensionality reduction component 110 are described in further detail below with respect to FIGS. 4-6.

While the dimensionality reduction component 110 as described herein with respect to some implementations utilizes per-subcarrier signal quality values for all utilized subcarriers, other sets of signal quality values could also be used. For example, signal quality values could be provided for only some of the frequency subcarriers, e.g., subcarriers for selected resource blocks (RBs) or frequency bands. In still other implementations, respective signal quality values received by the dimensionality reduction component 110 could correspond to groups of subcarriers used by the network cell 10. Other schemes for providing and utilizing signal quality values could also be used.

Based on the model input values generated by the dimensionality reduction component 110, the classification component 120 of system 100 can determine a data rate parameter (e.g., an MCS or the like) for the network cell 10 using a machine learning (ML) model. Various types of ML models that can be utilized by the classification component 120 are described in further detail below with respect to FIG. 3.

The link adaptation component 130 of system 100 can apply an MCS and/or other data rate parameter determined by the classification component 120 as described above to one or more transmissions conducted by the network cell 10. By assigning a data rate parameter determined by the classification component 120 via an ML model to the network cell 10, performance of the network cell 10 can be improved in terms of, e.g., lower block error rate (BLER) or other error rate metrics, higher data rate or throughput, or the like. For instance, the assigned data rate parameter can result in an error rate associated with transmissions from the network cell 10 to be less than a threshold value, and/or a data rate or throughput associated with said transmissions to be greater than a threshold value.

System 100 as shown in FIG. 1 can be utilized to facilitate link adaptation, which can enable optimization of cell throughput, e.g., in 5G new radio (NR) networks and/or other networks, while achieving target rates and reliability levels for network users. In this regard, the MCS can be adjusted based on channel conditions, which can be represented by SINR, hybrid automatic repeat request (HARQ) acknowledgment (ACK), and/or other metrics.

In the downlink, SINR can be estimated by a user equipment (UE) utilizing a channel state information reference signal (CSI-RS) and reported to a gNodeB (gNB) or other device associated with a network cell 10 via the channel quality indicator (CQI) field in a channel state information (CSI) report. The CQI value can then be used to adapt the MCS used in channels such as a physical downlink shared channel (PDSCH) on subsequent downlink slots.

Similarly, in the uplink, a gNB and/or other device associated with a network cell 10 can estimate the SINR on each subcarrier based on a sounding reference signal (SRS) and an average value of SINR on the allocated resource blocks (RBs) of PUSCH using an associated demodulation reference signal (DMRS). Based on this estimated SINR value (e.g., using SRS, PUSCH DMRS, or the like), the MCS of a subsequent uplink slot can be selected such that the BLER is less than a threshold, e.g., 10 percent for regular PUSCH transmissions. Additionally, a BLER-based MCS correction loop can be added in order to improve the previously described SINR-to-MCS mapping to maintain desired BLER levels.

The SINR of a channel is a multidimensional function, as each resource element (RE) is located at a different frequency and has its own different SINR level due to fast fading inducing channel selectivity. As a result, the transition from such a multidimensional description to a one-dimensional descriptor that predicts at which MCS a 10 percent BLER can be achieved cannot be performed analytically, e.g., with existing computing technology. Techniques for selecting an MCS based on an average SINR level are therefore suboptimal, which can increase decoding errors for the symbols on these subcarriers. Additionally, if the selected modulation order and coding rate are lower than that which can be supported, a portion of the total achievable throughput can be lost. As a result, these techniques yield a non-optimal MCS selection as the average SINR value does not reflect the channel condition on all subcarriers accurately.

Figure 2:
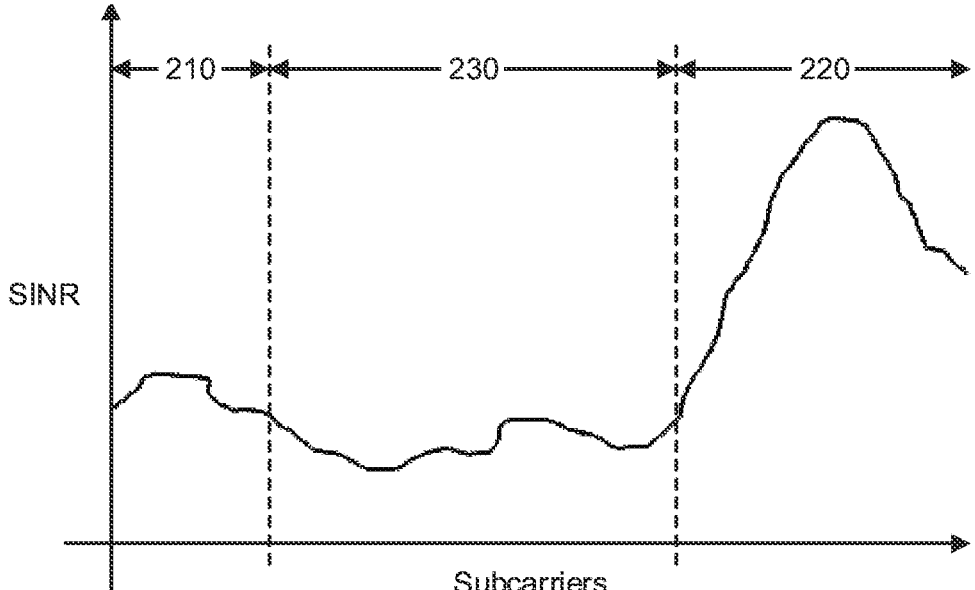
FIG. 2 is a diagram depicting example signal quality data over frequency subcarriers that can be utilized in various implementations described herein.

An instance of the above issue is illustrated by FIG. 2, where SINR values fluctuate on the different illustrated subcarriers. It is noted that while FIG. 2 illustrates an example in which SINR is used as a signal quality metric, other metrics could also be used. In the case shown in FIG. 2, a small number of subcarriers have high SINR values, e.g., as shown in regions 210 and 220, while the other subcarriers have low SINR values, e.g., as shown in region 230.

Various communication standards, such as the 5G NR standard, provide that all subcarriers associated with a given cell are associated with the same MCS level. As a result, all subcarriers shown in FIG. 2 can be associated with the same MCS level. If an MCS level is selected based on the high-SINR regions, e.g., regions 210 and 220, data sent on those regions will be successfully decoded but data sent on low-SINR regions, e.g., region 230, will have a lower success rate. Conversely, if an MCS is selected based on a low-SINR region, substantially all data sent on all of the subcarriers will be successfully decoded, but significant portions of throughput will be lost in the high-SINR regions that could have been achieved with a higher MCS.

In some techniques, the SINR values can be averaged across all subcarriers to yield an average SINR value. In the example shown in FIG. 2, averaging the SINR values across all subcarriers yields a high average SINR value, and a high MCS can be used accordingly. However, using a high modulation order and coding rate can increase the decoding errors of the symbols sent on the low-SINR subcarriers, which can in turn increase cyclic redundancy check (CRC) failures. This can particularly be the case for very high coding rates where even a small percentage of undecodable bits can render an entire code block undecodable, while this is less relevant for a low MCS. As a result, a non-optimal MCS selection can result in an increase in CRC failures, retransmissions, and/or throughput losses. This, in turn, can decrease cell throughput and degrade system performance.

Other techniques can provide BLER-based enhancements for MCS selection, e.g., by increasing or decreasing the MCS based on received CRCs. However, MCS modifications performed in this manner need a convergence time to adapt to the changing channel conditions, during which throughput and reliability can be degraded. As a result, these techniques are less optimal for fast changing channels (e.g., due to mobility) or when the scheduler changes the channel by changing the allocation position in the frequency domain.

Figure 3:
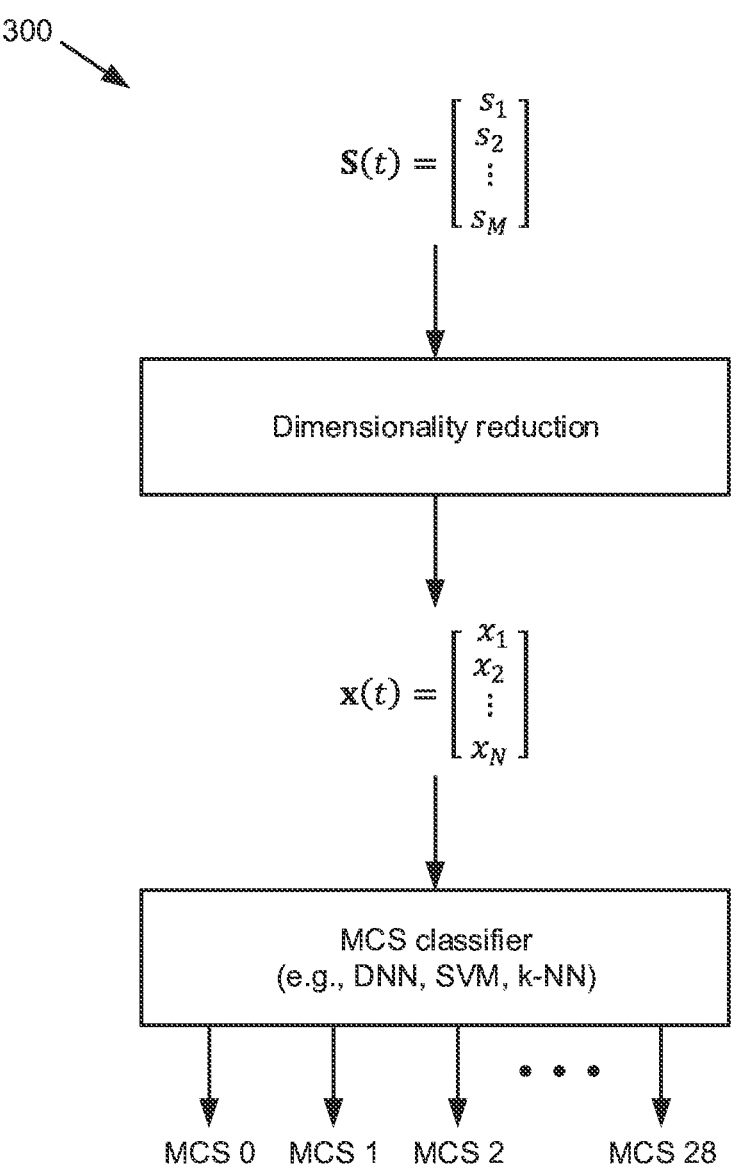
FIG. 3 is a diagram depicting an example link adaptation scheme that can be utilized in various implementations described herein.

In view of the above, various implementations described herein can utilize AI techniques to address the aforementioned challenges via a low-complexity approach. A diagram 300 of an example AI-based link adaptation scheme that can be utilized in accordance with various implementations described herein is shown in FIG. 3. The scheme shown by diagram 300 includes two components, namely a dimensionality reduction block and an MCS classifier block. The functionality of these blocks can respectively correspond to the functionality of the dimensionality reduction component 110 and the classification component 120 described above with respect to FIG. 1. Operation of the blocks shown in diagram 300 will be discussed in turn below.

The dimensionality reduction block shown in diagram 300 can reduce the dimensionality of input data to speed up the training and inference time of the MCS classifier. For instance, diagram 300 illustrates that the dimensionality reduction block can convert an input vector S(t) of M signal quality values $s_1$-$s_M$ respectively corresponding to M subcarriers into an output vector x(t) of N model input values $x_1$-$x_N$, where N is less than M. In various implementations, the dimensionality reduction block can utilize histogram-based processing, e.g., as described below with respect to FIGS. 4-5, statistics-based processing, e.g., as described below with respect to FIG. 6, and/or other suitable techniques.

The MCS classifier block shown in diagram 300 can classify input SINR data, e.g., as given by the output vector x(t) produced by the dimensionality reduction block as described above, into an MCS level that can achieve a desired level of BLER (e.g., 10 percent for regular PUSCH transmissions) while maximizing the data rate. While diagram 300 illustrates an example in which the MCS classifier selects an MCS from a group of 29 MCS values ranging from MCS 0 to MCS 28, it is noted that other groups of MCS levels or similar parameters could be used, e.g., depending on the network standard(s) or technology(-ies) used by an underlying network.

To achieve optimal MCS selection, the MCS classifier can use an ML-based classifier, such as a k-nearest neighbors (k-NN) classifier, a support vector machine (SVM), a neural network (NN), and/or any other suitable ML model type. Techniques for training and using a ML model via the MCS classifier are described in further detail below following further description of the dimensionality reduction block.

Figure 4:
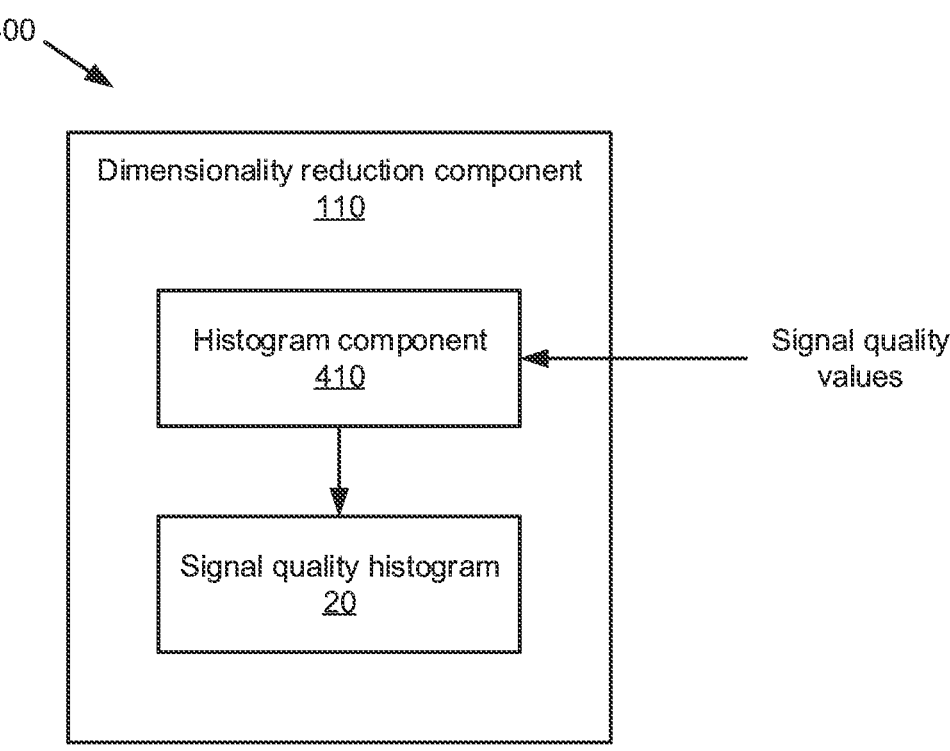
FIG. 4 is a block diagram of another system that facilitates low-complexity AI-based channel link adaptation in accordance with various implementations described herein.

Turning now to FIG. 4, a block diagram of another system 400 that facilitates low-complexity AI-based channel link adaptation is illustrated. Repetitive description of like parts described above with regard to other implementations is omitted for brevity. System 400 as shown in FIG. 4 includes a dimensionality reduction component 110, which can produce model input values for other components, such as a classification component 120 (not shown in FIG. 4), in a similar manner to that described above with respect to FIG. 1. The dimensionality reduction component 110 shown in FIG. 4 includes a histogram component, which can convert signal quality values, e.g., a vector S(t) of signal quality values as shown in FIG. 3, to a histogram 20 that includes bins corresponding to quantized ranges of the signal quality values. While the histogram component 410 is shown in FIG. 4 as part of the dimensionality reduction component 110, it is noted that the histogram component 410 could be implemented separately from the dimensionality reduction component 110 in some implementations.

In an implementation, the histogram component 410 can receive the estimated SINR or other signal quality values on different subcarriers or RBs and convert the received values into a histogram of predetermined quantized SINR levels. For instance, as shown in FIG. 3, the input can be a vector of M SINR values of subcarriers and/or RBs, $S(t)=[s_1, s_2, \ldots, S_M]^T$, during the current uplink slot t, and the output, $x(t)=[x_1, x_2, \ldots, x_N]^T$, can be a vector of the normalized number of occurrences of each SINR range based on a given number N of quantization levels.

Figure 5:
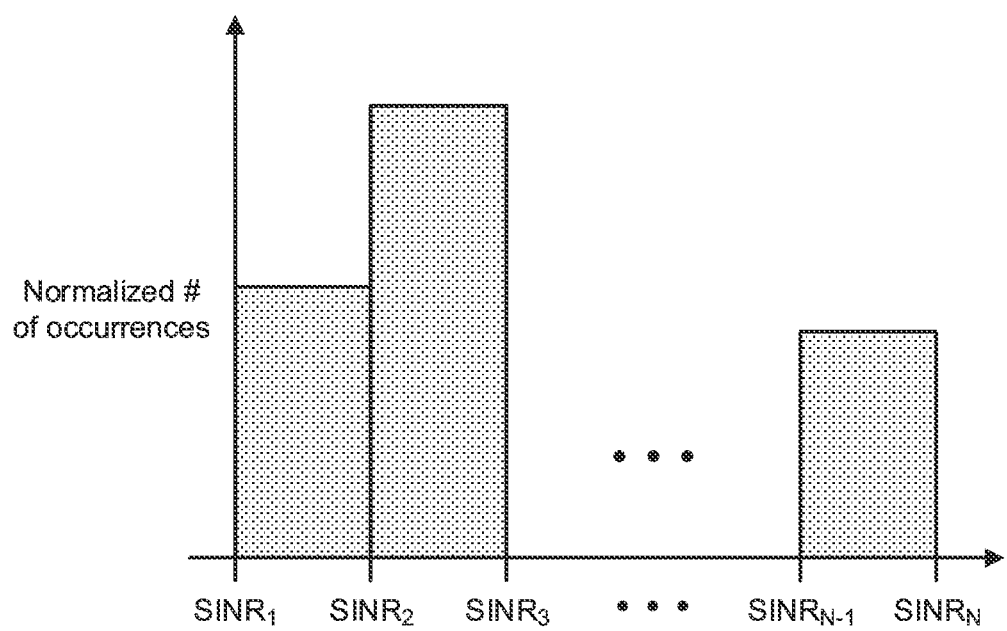
FIG. 5 is a diagram depicting an example histogram that can be utilized by the system shown in FIG. 4.

A graphical example of a histogram that can be generated and populated by the histogram component 410 as described above is shown in FIG. 5. As shown in FIG. 5, a histogram utilized by the histogram component 410 can include bins corresponding to respective quantized ranges of the input SINR values. For instance, the leftmost bin in FIG. 5 corresponds to signal quality values between SINR1 and SINR2, the second bin corresponds to values between SINR2 and SINR3, and so on. In an implementation, the number of bins of the histogram can be equal to the number of model input values generated by the dimensionality reduction component 110. Accordingly, the dimensionality reduction component 110 can generate, as the model input values, the normalized numbers of occurrences of each of the respective quantized ranges within the signal quality values.

To state the above in another way, respective SINR values corresponding to respective frequency subcarriers can be placed into respective bins of the histogram that correspond to the SINR ranges those values fall into. The model input values can then correspond to the number of SINR values that were placed into each of the bins as a result of the above.

In some implementations, the number of bins of a histogram utilized by the histogram component 410 can be based on a given step size, e.g., such that each bin corresponds to a range of a defined size (e.g., 1 dB, etc.). Accordingly, the number of bins of the histogram can correspond to a function of a total SINR range across the subcarriers (e.g., a difference between a highest SINR and a lowest SINR) relative to a defined step size used for the respective bins. Other techniques for structuring the histogram could also be used.

In addition to using signal quality values as a lower dimensional metric compared to the actual channel estimate, the histogram component 410 can also reduce the dimensionality of the input data, e.g., as described above. For example, instead of processing a vector having a number of elements equal to the total number of subcarriers (e.g., 3276 elements assuming 273 RBs with 12 subcarriers per RB), a shorter vector having a number of elements corresponding to the number of SINR values among those subcarriers can be used. By way of non-limiting example, the output vector of the histogram component 410 can have approximately 50 elements in a scenario in which the highest SINR level is 30 dB, the lowest SINR level is –20 dB, and quantization levels having a width of 1 dB are used. The specific number of elements could, of course, vary depending on the actual SINR range of the subcarriers. As a result of this reduction, the training and processing time of an associated ML model can be reduced during online operation while providing more accurate model predictions.

A histogram-based approach, such as the one described above, can operate on the principle that the probability of a code block with a specific MCS does not depend strongly on the location of the subcarriers with high and/or low SINR, but rather on their numbers. Therefore, a histogram can be used to capture most of the information associated with predicting an MCS that achieves a desired BLER level.

Figure 6:
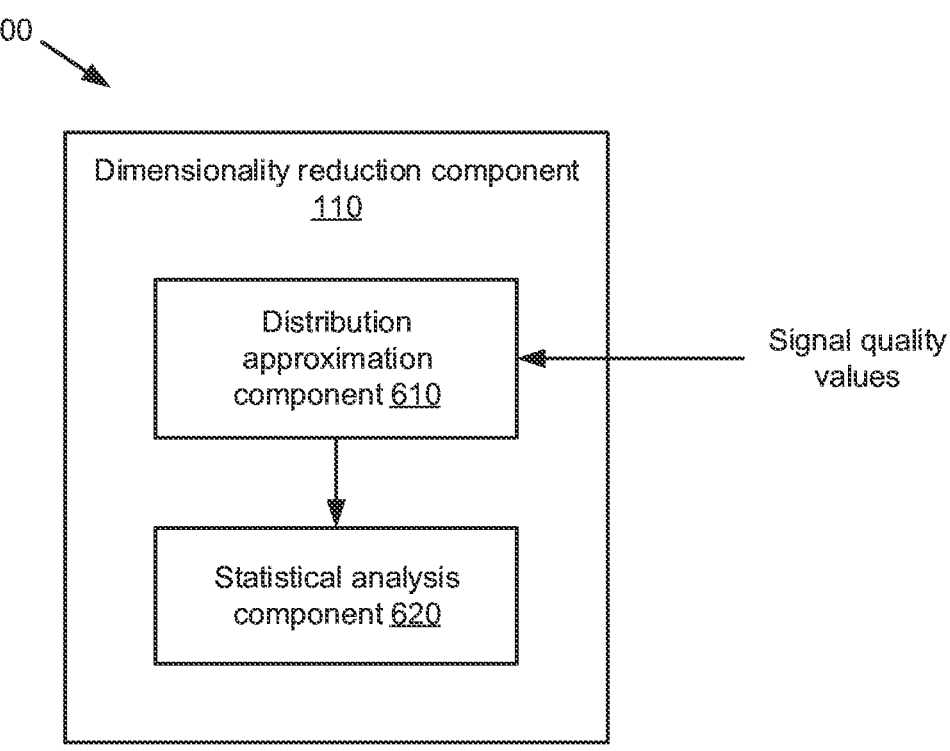
FIGS. 6-7 are block diagrams illustrating additional systems that facilitate low-complexity AI-based channel link adaptation in accordance with various implementations described herein.

With reference next to FIG. 6, a block diagram of still another system 600 that facilitates low-complexity AI-based channel link adaptation is illustrated. Repetitive description of like parts described above with regard to other implementations is omitted for brevity. System 600 as shown in FIG. 6 includes a dimensionality reduction component 110, which in turn includes a distribution approximation component 610 and a statistical analysis component 620 that can operate as described below. While the distribution approximation component 610 and the statistical analysis component 620 are shown in FIG. 6 as part of the dimensionality reduction component 110, it is noted that one or both of these components 610, 620 could be implemented independently of the dimensionality reduction component 110, e.g., in a similar manner to that described above with respect to FIG. 4.

In an implementation, the distribution approximation component 610 can generate a semi-Gaussian approximation of the signal quality values received by the dimensionality reduction component 110 over respective subcarriers. The statistical analysis component 620 can then extract properties of the approximated distribution, such as an average signal quality value, a standard deviation or variance associated with the approximated distribution, and/or other parameters. These and/or other parameters can then be provided by the dimensionality reduction component 110 as model input values, e.g., as described above.

In an alternative implementation to that described above, the statistical analysis component 620 can extract an average, variance, and/or other properties of the signal quality values directly from the raw signal quality data, e.g., instead of on the basis of an approximated distribution generated via the distribution approximation component 610. In either of these implementations, however, the resulting model input dimensionality can be reduced via system 600 more aggressively than that described above with respect to the histogram-based approach. For instance, by assuming the signal quality histogram follows a Gaussian approximation, a set of two parameters can be used to characterize it, which are the average quality value and the variance.

It is noted that the channel SINR histogram often does not follow a Gaussian distribution, meaning that the approach shown in FIG. 6 can in some cases be less optimal than the histogram-based approach described above. In contrast, the advantage of a statistical approach such as that shown in FIG. 6 is that MCS selection can still be improved most of the time while introducing minimal additional processing time as compared to conventional approaches and facilitating faster model learning and inference.

Returning to FIG. 3, the MCS classifier block shown in diagram 300 can be responsible for classifying an input SINR histogram (e.g., as described above with respect to FIGS. 4-5), statistical parameters corresponding to an input SINR distribution (e.g., as described above with respect to FIG. 6), and/or other input data into an MCS or other data rate parameter that can achieve a desired level of BLER (e.g., 10 percent for regular PUSCH transmissions) while maximizing the data rate. To achieve this, an ML-based classifier can be used, such as a k-NN model, an SVM, an NN, or the like. This ML model can initially be trained offline and then used in real time to provide accurate predictions of an MCS for use. These steps are described in turn below.

Offline training: In an implementation, training of the ML model can be done by generating different cases of uplink SINR, e.g., via simulation and/or from past network data, and calculating the corresponding model input parameters (e.g., a histogram, a mean and variance, etc.) and the BLER values for those transmissions as received by a gNB. Based on this dataset, the ML model can optimize its internal parameters to predict an MCS that satisfies a required BLER level and maximizes the data rate. In one implementation, this optimization can be based on a suitable cost function that can take into account relationships between given MCS levels and their corresponding BLERs. For example, the cost function can be based on the total throughput for a given cell and transmission error rates for respective data rate parameters. Other cost functions could also be used.

Real-time operation: After training the ML model, it can be used in real time to predict an MCS to be used for a given uplink slot given the model input parameters corresponding to that slot as provided via the dimensionality reduction block. As a result of the dimensionality reduction, the online operation of the ML model can be low in complexity, e.g., based on a matrix multiplication process using a low-dimensional input such as a histogram vector, a mean and variance, or the like.

As a result of utilizing an approach such as that shown by diagram 300, an AI-based scheme can be used to select a best MCS for a given situation without that selection being explicitly programmed and in a manner that utilizes already available data in 5G systems. Additionally, the components can be designed such that they address the challenge of averaging the SINR values. Further, the dimensionality reduction techniques described above can be used to reduce the training and processing times of the proposed models and to increase prediction accuracy.

Figure 7:
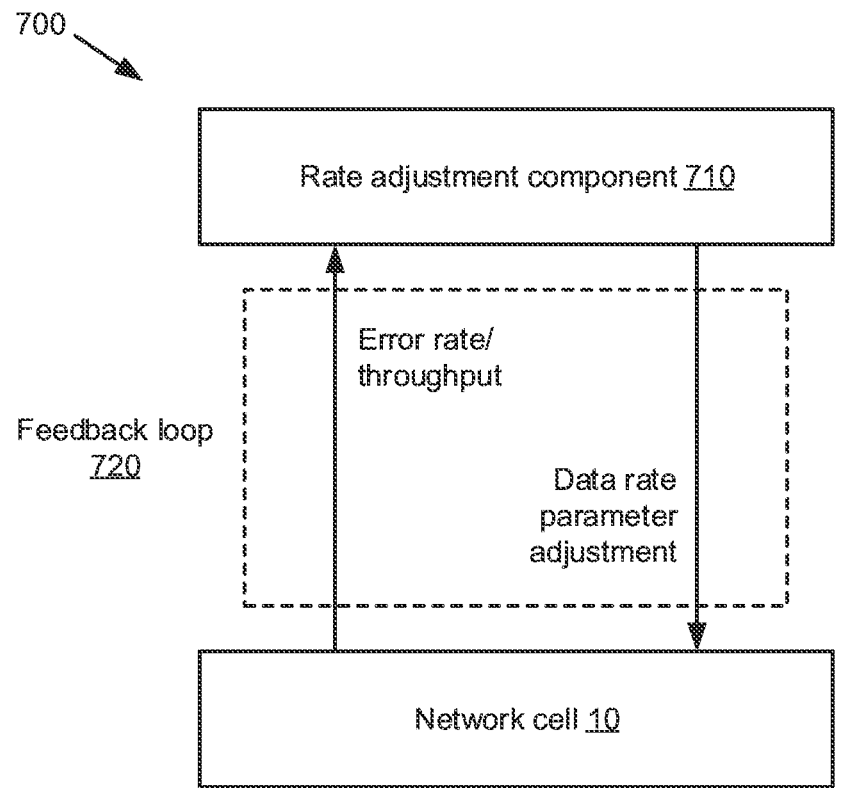

Referring now to FIG. 7, a block diagram of an additional system 700 that facilitates low-complexity AI-based channel link adaptation is illustrated. System 700 as shown in FIG. 7 includes a rate adjustment component 710 that can modify a data rate parameter (e.g., an MCS as determined via a classification component 120 as described above) based on an error rate and/or throughput associated with a transmission conducted by a network cell 10 using the data rate parameter. In doing so, the rate adjustment component 710 and the network cell 10 can implement a feedback loop 720 to tune the MCS and/or other parameters used by the network cell 10, e.g., in instances where full AI-based classification is not desired and/or not warranted based on changes to channel characteristics.

Turning to FIG. 8, a flow diagram of a method 800 that facilitates low-complexity AI-based channel link adaptation is illustrated. At 802, a device comprising a processor can convert (e.g., by a dimensionality reduction component 110) a first vector of signal quality values corresponding to respective frequency subcarriers utilized by a cell of a communication network (e.g., a network cell 10) into a second vector of model input parameters that is smaller than the first vector.

At 804, the device can select (e.g., by a classification component 120) an MCS based on applying the second vector generated at 802 to an ML model.

At 806, the device can facilitate (e.g., by a link adaptation component 130) conducting a transmission from the cell using the MCS selected at 804. As a result of using the MCS, the transmission facilitated at 806 can have a first throughput that is higher than a second throughput of the cell prior to the MCS being selected.

Referring next to FIG. 9, a flow diagram of a method 900 that can be performed by a processor, e.g., based on machine-executable instructions stored on a non-transitory machine-readable medium, is illustrated. An example of a computer architecture, including a processor and non-transitory media, that can be utilized to implement method 900 is described below with respect to FIG. 10.

Method 900 can begin at 902, in which the processor can generate a first number of model input values based on a second number of SNR values associated with respective frequency subcarriers utilized by a cell of a communication network, where the number of model input values is less than the number of SNR values.

At 904, the processor can select an MCS based on classifying the model input values generated at 902 using an ML model.

At 906, the processor can apply the MCS selected at 904 to a first transmission conducted by the cell, resulting in a throughput of the first transmission being higher than the throughput of a second transmission that was conducted by the cell prior to applying the MCS.

FIGS. 8-9 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 10:
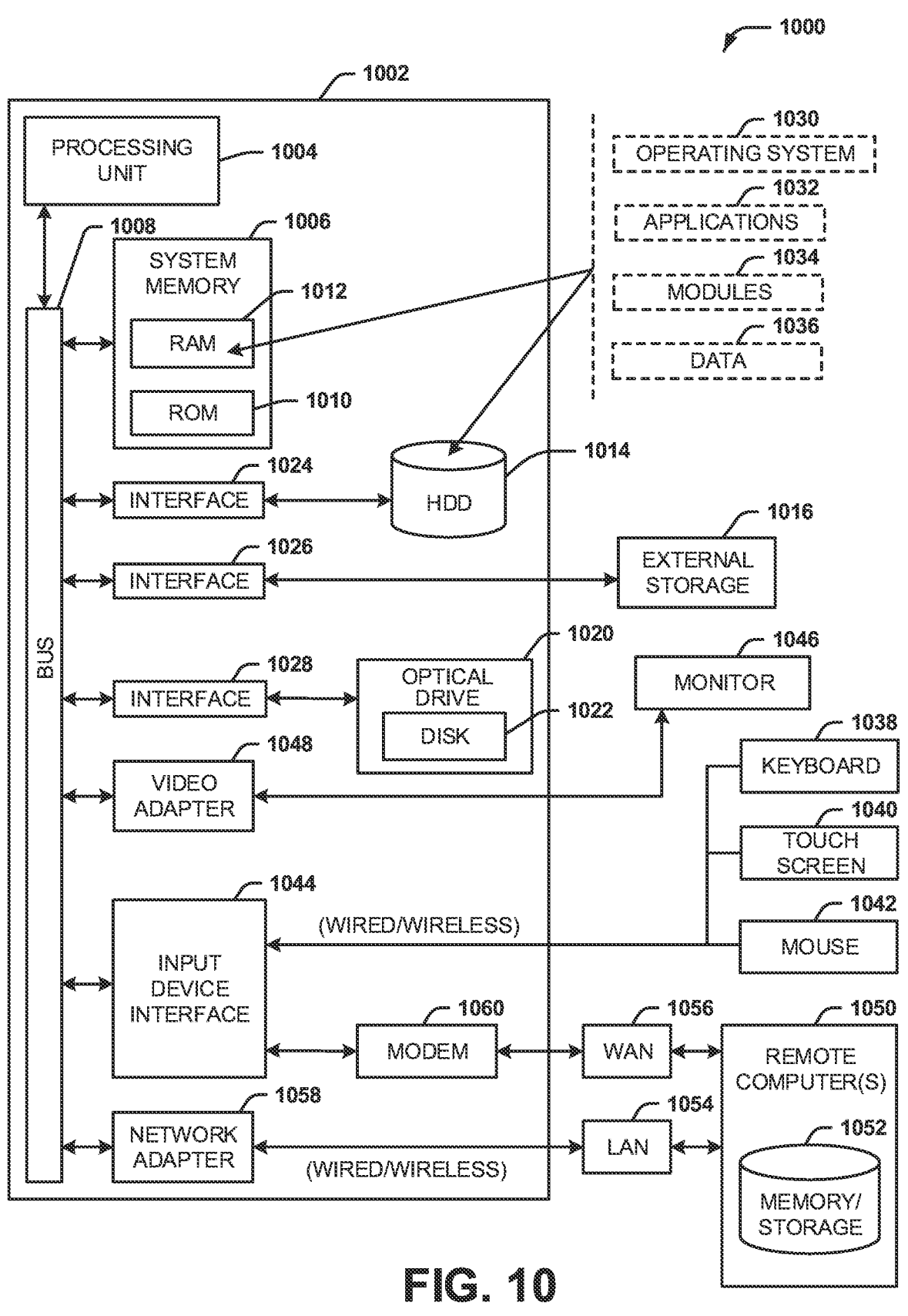
FIG. 10 is a diagram of an example computing environment in which various implementations described herein can function.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD), a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory that stores executable components; and
   a processor that executes the executable components stored in the memory, wherein the executable components comprise:
   a dimensionality reduction component that generates, based on signal quality values respectively corresponding to respective ones of a first number of frequency subcarriers utilized by a cell of a communication network, a second number of model input values, wherein the second number is less than the first number;
   a classification component that selects, via a machine learning model and based on the model input values, a data rate parameter for the cell; and
   a link adaptation component that applies the data rate parameter to a transmission conducted by the cell, resulting in an error rate associated with the transmission being less than a threshold error rate.

2. The system of claim 1, wherein the executable components further comprise:
   a histogram component that converts the signal quality values to a histogram comprising bins corresponding to quantized ranges of the signal quality values, wherein an amount of the bins of the histogram is equal to the second number.

3. The system of claim 2, wherein the dimensionality reduction component generates, as the model input values, a vector of normalized numbers of occurrences of respective ones of the quantized ranges within the signal quality values based on the histogram.

4. The system of claim 2, wherein the second number is a function of a difference between a highest signal quality value of the signal quality values and a lowest signal quality value of the signal quality values relative to a defined size of the quantized ranges of the signal quality values.

5. The system of claim 1, wherein the model input values comprise an average signal quality value of the signal quality values and a variance value associated with the signal quality values.

6. The system of claim 1, wherein the data rate parameter comprises a modulation and coding scheme.

7. The system of claim 1, wherein the machine learning model is trained according to a cost function, the cost function being based on a total throughput for the cell and a transmission error rate for respective data rate parameters, comprising the data rate parameter.

8. The system of claim 1, wherein the executable components further comprise:
   a rate adjustment component that modifies the data rate parameter based on the error rate associated with the transmission conducted by the cell.

9. The system of claim 1, wherein the signal quality values comprise signal to noise ratio values.

10. A method, comprising:
   converting, by a device comprising a processor, a first vector of signal quality values corresponding to respective frequency subcarriers utilized by a cell of a communication network into a second vector of model input parameters, wherein the first vector has a first size that is greater than a second size of the second vector;

selecting, by the device, a modulation and coding scheme based on applying the second vector to a machine learning model; and facilitating, by the device, conducting a transmission from the cell using the modulation and coding scheme, resulting in the transmission having a first throughput that is higher than a second throughput associated with the cell before the facilitating.

11. The method of claim 10, wherein the converting comprises populating a histogram with the signal quality values of the first vector, wherein the histogram comprises bins corresponding to respective signal quality ranges, and wherein a number of the bins is equal to the second size of the second vector.

12. The method of claim 11, wherein the converting further comprises populating the second vector with normalized amounts of occurrences of the respective signal quality ranges within the signal quality values based on the histogram.

13. The method of claim 10, wherein the model input parameters comprise an average signal quality value of the signal quality values and a variance value associated with the signal quality values.

14. The method of claim 10, further comprising:

modifying, by the device in response to the facilitating, the modulation and coding scheme based on the first throughput.

15. The method of claim 10, wherein the machine learning model is selected from a group of machine learning models comprising a k-nearest neighbors model, a support vector machine, and a neural network.

16. A non-transitory machine-readable medium comprising computer executable instructions that, when executed by a processor, facilitate performance of operations, the operations comprising:

generating a first number of model input values based on a second number of signal to noise ratio values associated with respective frequency subcarriers utilized by a cell of a communication network, wherein the first number is less than the second number;

selecting a modulation and coding scheme based on classifying the model input values using a machine learning model; and applying the modulation and coding scheme to a first transmission conducted by the cell, resulting in a first throughput of the first transmission being higher than a second throughput of a second transmission conducted by the cell prior to the applying.

17. The non-transitory machine-readable medium of claim 16, wherein the generating of the model input values comprises:

generating a histogram having a number of bins equal to the first number, wherein the bins of the histogram correspond to respective quantized ranges of the signal to noise ratio values; and placing a signal to noise ratio value, of the signal to noise ratio values, into a bin of the bins of the histogram based on the signal to noise ratio value being within a quantized range, of the quantized ranges and associated with the bin.

18. The non-transitory machine-readable medium of claim 17, wherein the generating of the model input values further comprises generating, as the model input values, amounts of occurrences of respective ones of the quantized ranges of the signal to noise ratio values as given by the bins of the histogram.

19. The non-transitory machine-readable medium of claim 16, wherein the operations further comprise:

approximating a distribution of the signal to noise ratio values as a Gaussian distribution, resulting in an approximated distribution.

20. The non-transitory machine-readable medium of claim 19, wherein the wherein the generating of the model input values comprises generating, as the model input values, an average signal to noise ratio value of the approximated distribution and a standard deviation of the approximated distribution.

* * * * *